United States Patent [19]
Tite

[11] Patent Number: 4,928,858
[45] Date of Patent: May 29, 1990

[54] METERING DEVICE FOR SEED OR FERTILIZER

[75] Inventor: Raymond C. Tite, Coventry, United Kingdom

[73] Assignee: Massey-Ferguson Services N.V., Curacao, Netherlands

[21] Appl. No.: 184,928

[22] Filed: Apr. 22, 1988

Related U.S. Application Data

[63] Continuation of Ser. No. 871,395, Apr. 17, 1986, abandoned.

[30] Foreign Application Priority Data

Aug. 22, 1984 [GB] United Kingdom ............... 8421337

[51] Int. Cl.⁵ .................................................. B65D 88/54
[52] U.S. Cl. ................................... 222/312; 222/609; 222/368; 111/34; 74/606 R
[58] Field of Search ................ 222/182, 185, 288, 367, 222/368, 369, 414, 609, 610, 623, 164, 618, 626, 344, 410, 298, 299, 300, 329, 303, 304, 311, 307, 312, 313, 315; 221/266, 277; 49/394; 111/34, 35, 77; 74/606 R

[56] References Cited

U.S. PATENT DOCUMENTS

| | | | |
|---|---|---|---|
| 151,161 | 5/1974 | Rogers | 111/78 |
| 208,945 | 10/1978 | Woods | 222/368 |
| 310,228 | 1/1885 | Riter | 222/299 |
| 1,242,067 | 10/1917 | Stiglitz | 49/394 X |
| 1,272,828 | 7/1918 | Madsen | 222/367 |
| 3,620,419 | 11/1971 | Bailey | 222/609 X |
| 4,259,912 | 4/1981 | Stocks et al. | 111/69 X |
| 4,264,023 | 4/1981 | Stocks et al. | 111/69 X |
| 4,408,704 | 10/1983 | Steilen | 222/312 |

FOREIGN PATENT DOCUMENTS

0724417 3/1980 U.S.S.R. ............................ 222/368

Primary Examiner—Michael S. Huppert

[57] ABSTRACT

A metering device for seed having a housing (7), a rotary metering member (27) that is rotatably mounted on a shaft 32 in open slots (25, 26) in a pair of side walls (8, 9) of the housing with the axis of rotation of the shaft extending transversely to the side walls. The rotary metering member and shaft are removable from the housing through the slots in a direction extending laterally of the axis of rotation and a closure member (36) is provided which is pivotally connected to the housing so as to extend across and close the ends of the slots (25, 26), thus retaining the rotary metering member (27) in position. Removal of the rotary metering member is therefore simply achieved by releasing the closure member pivotting it away from the housing and withdrawing the metering member and shaft laterally through the now open ends of the slots.

23 Claims, 7 Drawing Sheets

METERING DEVICE FOR SEED OR FERTILIZER

This is a continuation of co-pending application Ser. No. 06/871,395 filed on Apr. 17, 1986 and now abandoned.

TECHNICAL FIELD

This invention relates to a metering device suitable for use in metering seed and/or fertilizer in an agricultural drill.

A well known form of metering device disclosed in U.K. Pat. No. 1 274 673 comprises a housing, a rotary metering member that is rotatably mounted in slots in a pair of side walls of the housing with its axis of rotation extending transversely of said side walls and that is removable from the housing through said slots in a direction extending laterally of said axis of rotation.

The rotary metering member comprises a cylindrical cut-off member mounted axially alongside a fluted feed roll on a drive shaft so that the feed roll is driven by rotation of the shaft while the cut-off member remains stationary.

A cut-off flap is pivotally mounted within the housing substantially below the rotary metering member and is spring loaded so that its free end engages the cut-off member and defines a metering slot with the feed roll through which seed or fertilizer is displaced by rotation of the roll. Axial adjustment of the rotary metering member varies the width of the metering slot within the housing and therefore, in combination with the speed of rotation, allows adjustment of the metering rate.

A rotary sealing member forms a seal between the feed roll and the adjacent side wall of the housing, the sealing member being rotatably received in a U-shaped slot in said side wall, and the feed roll projecting as a slide fit through a fluted aperture in the sealing member. The sealing member is retained in place by a releasable spring clip that is generally U-shaped with its arms extending across peripheral portions of the sealing member either side of the feed roll so as to hold the sealing member against the outer surface of said side wall. The cylindrical cut-off member is received as a close slide fit in a circular aperture in the opposite side wall from the spring-clip and cannot be shifted axially free of this aperture while the spring-clip holds the sealing member in place. However, once the spring-clip is released, the sealing member and rotary metering member can be shifted axially to free the cut-off member from its circular aperture.

The rotary metering member complete with shaft can then be moved laterally of the shaft axis through the slots, the shaft being removed from said circular aperture through a narrower opening between said aperture and an edge of the side wall.

The benefit of this type of construction which allows ready removal of the rotary metering member, is that all of the metering members on a common seed metering drive shaft of a drill can be easily removed for cleaning or for changing of the feed rolls for others suited to different seeds.

DISCLOSURE OF THE INVENTION

An object of the present invention is to provide a metering device that retains the feature of having a readily removable rotary metering member, but which is of improved design to make such removal even easier.

According to the present invention, a metering device comprises a housing, a rotary metering member that is rotatably mounted in slots in a pair of side walls of the housing with its axis of rotation extending transversely of said side walls and that is removable from the housing through said slots in a direction extending laterally of said axis of rotation, characterised in that a closure member is provided which is releasably connected to the housing so as to extend across and close one or both slots thereby to retain the rotary metering member therein. Removal of the rotary metering member is therefore simply achieved by releasing the closure member and withdrawing the metering member laterally of said axis without having to move the latter axially.

Preferably, the closure member takes the form of a pivoted flap having side wall portions coplanar with the side walls of the housing and which cooperate with the slots to closely surround the whole periphery of parts of the rotary metering member and rotary sealing means to retain the metering member in place.

A cut-off member forming part of the rotary metering member may be non-circular in cross section and may be orientated angularly by engagement between a corresponding shaped slot in the adjacent side wall of the housing and the closure member.

The rotary sealing means is preferably retained axially by abutment means on the flap which automatically engage when the flap is closed.

Additional abutment means may be provided to retain the rotary sealing means in place and which is operatively connected to a control lever that holds the flap in its closed position so that release of the lever automatically disengages the additional abutment means from the sealing means. This control lever may comprise a lever which controls the spring-loading of a cut-off flap that is pivotally mounted within the housing to cooperate with the cut-off member.

DESCRIPTION OF THE DRAWINGS

The invention will now be described by way of example with reference to the accompanying drawings, in which.

BEST MODE OF CARRYING OUT THE INVENTION

Figure 1:
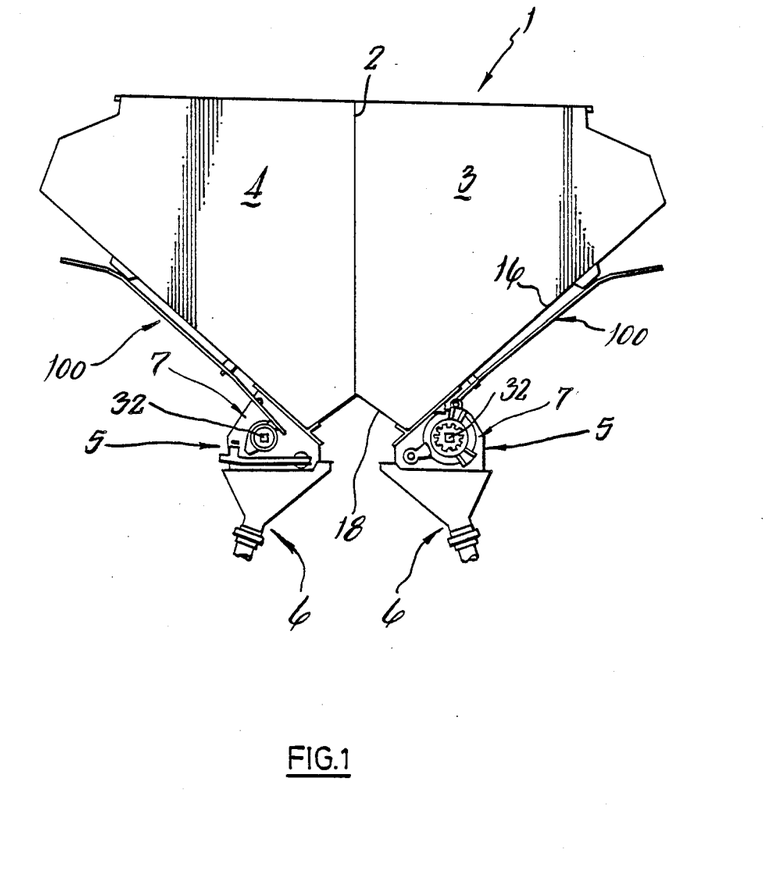
FIG. 1 is a diagrammatic end view of a combined seed and fertilizer drill including metering devices according to the present invention.

The combined seed and fertilizer drill shown in FIG. 1 comprises a hopper / having a vertical internal 2 partition dividing it into a seed and fertilizer compartment 3, 4, respectively. The compartments 3, 4 are similar and each has associated with it a plurality of metering devices 5 to meter seed or fertilizer from the hopper into respective delivery tubes 6 that are connected to coulters (not shown) at their lower ends, thereby to deliver seed and fertilizer to furrows opened by the coulters in the soil.

Each metering device 5 comprises a housing 7 having a pair of parallel upright side walls 8, 9 interconnected by walls 10, 11 front and rear (FIG. 4), with the upper edges of all four walls defining a rectangular opening 12 surrounded by an outwardly projecting fastening flange 13. Four tapped holes 14 in the flange 13 allow the housing to be secured by screws 15 to the bottom wall 16 of the hopper with the opening 12 communicating with an outlet 17 in the bottom wall 16 to receive seed or fertilizer. Outlet 17 is formed at the lower edge of wall 16 where the latter joins an oppositely inclined bottom wall 18, and a locating lug 19 formed by an upward extension of the wall 10 cooperates with the bottom wall 18 to locate the housing. Locating pegs 20 are also formed on the flange 13 each side of the opening 12 to engage corresponding holes 21 in the bottom wall 16 each side of the outlet 17.

A shallow recess is formed in the upper face of the flange 13 by rebates 22 along the side of each opening parallel to the side walls 8, 9, and by a channel 23 across the rear of the flange. This recess is adapted to receive a cut-off slide 24, if needed for tramlining, the slide being controlled by a system such as described in British Pat. No. 2 034 562 so that it closes opening 12 to stop the transfer of seed from the hopper into the metering device. Thus, the corresponding furrows remain unsown to form tramlines in the growing crop for the tractor or implement wheels in subsequent crop treatment operations.

A pair of rearwardly opening slots 25, 26 are formed in the side walls 8, 9 of the housing 7 and support a rotary metering member 27 with its axis of rotation extending transversely of the side walls 8, 9. The rotary metering member 27 comprises a fluted metering roll 29 having a tubular coaxial extension 30 on which is rotatably mounted a cut-off member 31. A square section drive shaft 32 extends through the metering roll 29 and engages a corresponding section in the tubular extension 30 so that the shaft serves to rotate the metering roll. A collar 33 is mounted on the free end of the tubular extension 30 and serves to retain the cut-off member axially thereon against the metering roll. A radial grub screw 34 secures the collar to the tubular extension 30 and also engages the drive shaft 32 to key the whole rotary metering member 27 axially in position on the drive shaft 32.

The cut-off member 31 is non-circular in cross-section, and the slot 26 in the adjacent side wall 9 of the housing 7 is correspondingly shaped to receive the cut-off member as a close non-rotatable fit. The slot 25 in the opposite side wall 8 is U-shaped and supports rotary sealing means 35 through which the metering roll 29 projects. The cut-off member 31 and the rotary sealing means 35 are retained in their respective slots 26, 25 by a closure member 36 in the form of a pivoted flap having side wall portions 37, 38 coplanar with the side walls 8, 9, respectively, and which are shaped to cooperate with the slots 25, 26 and closely surround the whole periphery of the sealing means 35 and cut-off member 31, respectively. The closure flap has a rear wall 39 interconnecting the side wall portions 37, 38 and a pair of lugs 40 project from the upper end of the rear wall 39 below the rear of flange 13 and are connected between the side walls 8, 9 by a pivot pin 41 so that the flap swings downwards into engagement across the rear of the housing 7. In this position, the rear wall 39 forms a continuation of the wall 11 of the housing and passes closely over the top of the rotary metering member 27 (See FIG. 4).

Figure 4:
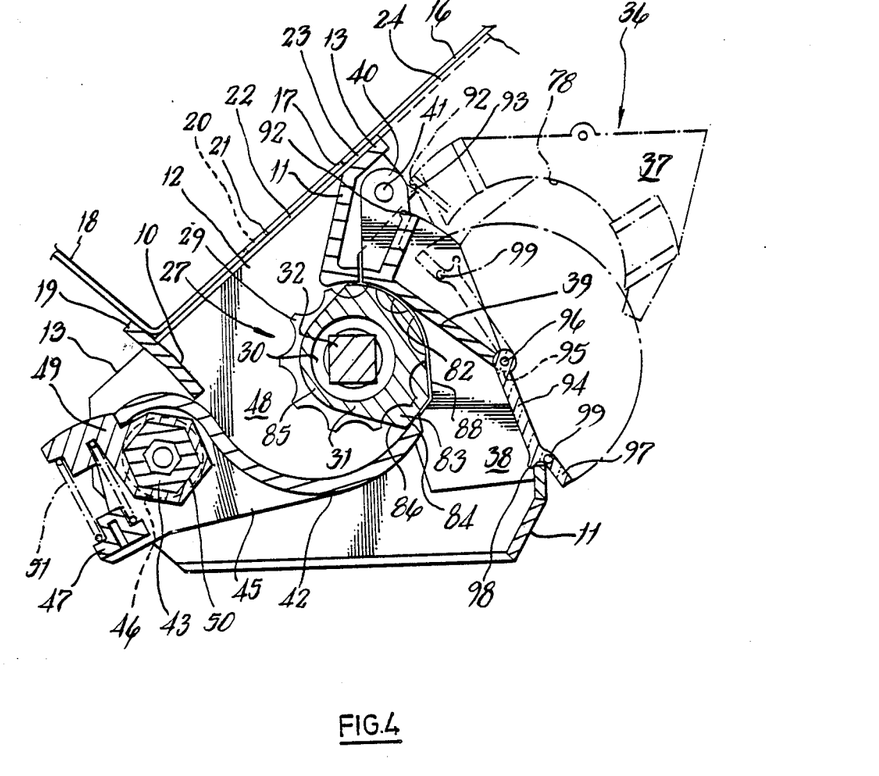
FIG. 4 is a transverse cross-sectional view of the metering device of FIG. 2.

A cut-off flap 42 is pivotally mounted within the housing on a transverse shaft 43 that is rotatably supported in circular apertures 44 in the side walls 8, 9 below the front of flange 13. The flap 42 has side walls 45 formed with circular apertures 46 for the shaft 43 and connected by a cross member 47. The flap 42 extends rearwards from the shaft 43 below the wall 10 and in an arc below the metering member 27, and the rear end of the flap is spring-loaded against the underside of the cut-off member 31. The cut-off flap 42 therefore forms the lower wall of a seed chamber 48 within the housing from which seed is metered over the rear edge of the cut-off flap by rotation of the feed roll 29 in the anticlockwise sense, as seen in FIG. 4.

The mechanism that spring loads the cut-off flap 42 comprises a spring arm 49 that is non-rotatably mounted on the shaft 43 between the side walls 45 of the cut-off flap, the shaft 43 being of hexagonal cross-section and being received in a corresponding hexagonal section aperture 50 in the arm 49. A compression spring 51 acts between the arm 49 and the cross member 47 to urge the two apart. The angular position of the arm 49 is controlled by an external control lever 52 that is connected to one end of the shaft 43 alongside the side wall 9 of the housing. The lever 52 engages a recess 53 in the end of the shaft and is held therein by a nut and bolt 54, 55.

Figure 5:
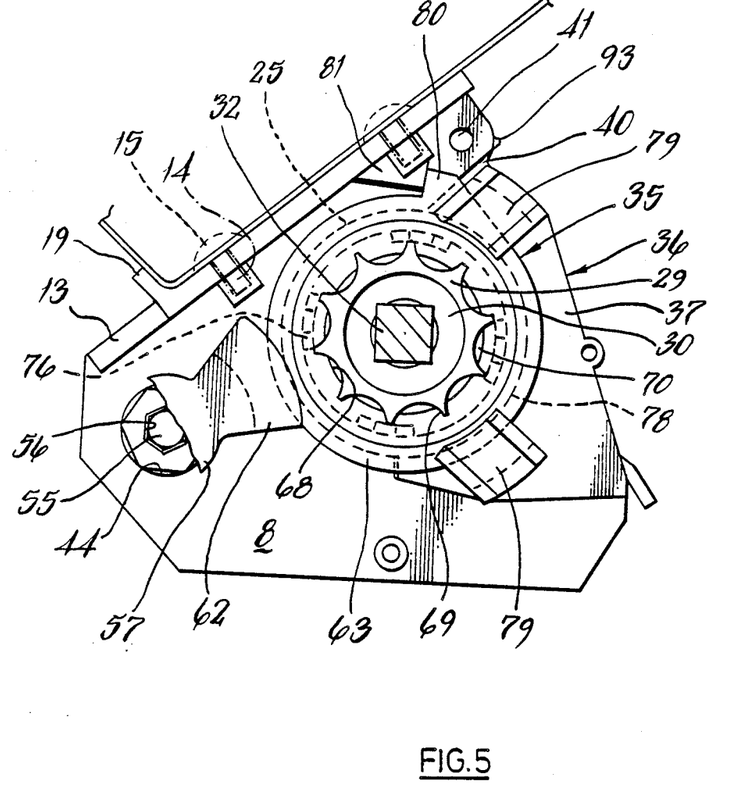
FIG. 5 is a side view of the metering device of FIG. 2, as seen from the left-hand side.
Figure 6:
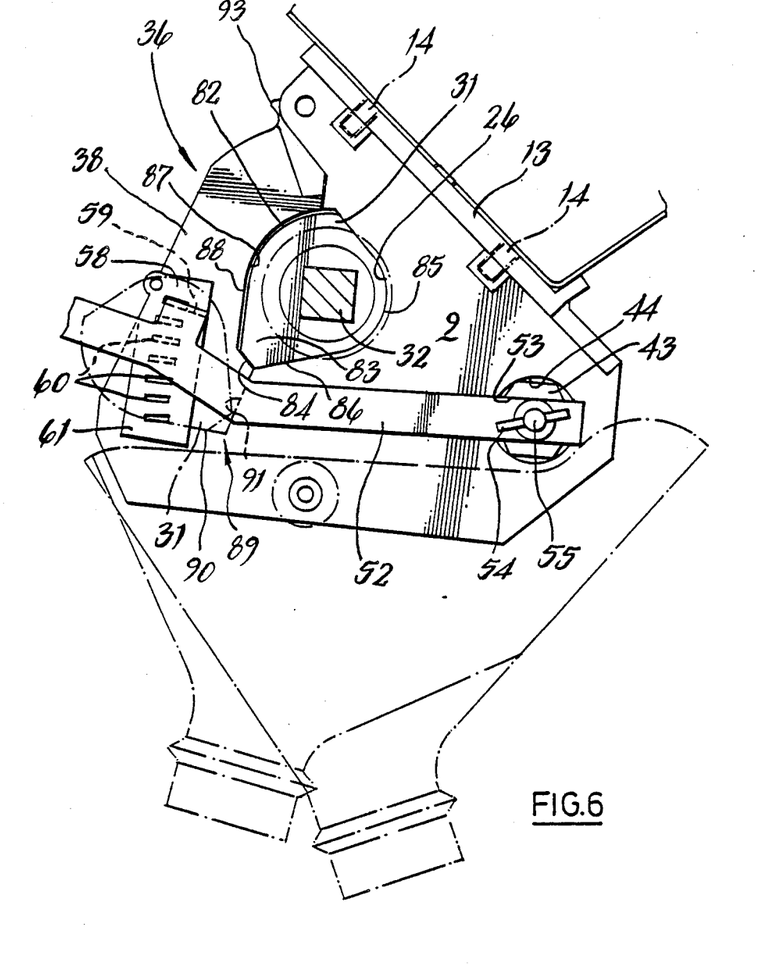
FIG. 6 is a side view of the metering device of FIG. 2, as seen from the right-hand side.

The bolt 55 is inserted through a hexagonal blind bore 56 from the other end of the shaft 43, (FIG. 5) and the wing nut 54 is threaded onto the end of the bolt that projects from the shaft through the end of the control lever 52 (FIG. 6). The bolt 55 is held against rotation by engagement of the hexagonal head of the bolt in the hexagonal blind bore 56. A collar 57 formed on the opposite end of the shaft 43 abuts the adjacent side wall 8 of the housing once inserted through the apertures 44, and is retained in place by the control lever 52 once the latter is connected.

The angular position of the control lever 52 is determined by engagement with stop means 58 on the side wall portion 38 of the closure flap 36 (FIG. 6). A lug 59 on the lever 52 is selectively engageable with any one of a series of slots 60 formed in the stop means 58, the lever being resilient enough to allow the lug 59 to be moved sideways to disengage the stop means 58, when required. Thus the angular setting of the control lever 52 controls the angular setting of the spring arm 49, which in turn determines the spring loading of the cut-off flap 42 against the cut-off member 31.

As well as controlling the spring-loading of the cut-off flap 42, it will be appreciated that engagement of the lug 59 with the stop means 58 serves to latch the closure flap 36 closed, thereby avoiding the need for any separate latch mechanism. Also, the lower end of the stop means 58 is formed as a lug 61 to overlap the outer face of the side wall 9 and thereby help support the closure flap laterally.

The control lever 52 also controls an abutment lug 62, that is formed as a radial extension of the collar 57 and cooperates with the rotary sealing means 35 to retain the latter axially in place in the slot 25 in the side wall 8. As shown in FIG. 5, the abutment lug 62 is spaced away from the adjacent side wall 8 and moves in an arc with the control lever so as to overlap a peripheral flange 63 of the rotary sealing means 35.

The rotary sealing means 35 consists of an assembly (FIGS. 7 and 8) comprising an annular support member 64 through which the sealing means is mounted on the side wall 8 in slot 25, and inner and outer rotary sealing rings 65, 66 that are locked together axially one either side of the support member 64 and which each have a central opening 67, 68 to receive the flutes of the feed roll 29 as an axial slide fit.

The central opening 67 in the inner rotary sealing ring 65 has a fluted shape that closely matches that of the periphery of the fluted feed roll 29 so as to form a seal against seed. The central opening 68 in the outer rotary sealing ring 66 is circular with peripheral notches 69 to engage the crests of the flutes on the feed roll 29, thereby leaving gaps 70 (FIG. 5) between the ring 66 and the troughs of the flutes for the escape of dust and powder from between the two rings 65, 66.

The support member 64 comprises a flat ring which engages against the outer face of the side wall 8 and which forms said peripheral flange 63 that is engaged by the abutment lug 62. Circular walls 71, 72 (FIG. 8) coaxial with the support ring 64 project from opposite faces thereof. The wall 71 on the rear face is a close fit in the slot 25 and receives the inner sealing ring 65 as a close rotary fit against an internal shoulder 73. Locking tangs 74 on the sealing ring 65 project into the central circular opening 75 of the support ring 64. The outer sealing ring 66 abuts the edge of the circular wall 72 on the front face and has locking tangs 76 (FIGS. 8 and 9) that project into the central opening 75 and cooperate with the tangs 74 on the other sealing ring 65 to lock the two together axially.

Figures 7, 8:
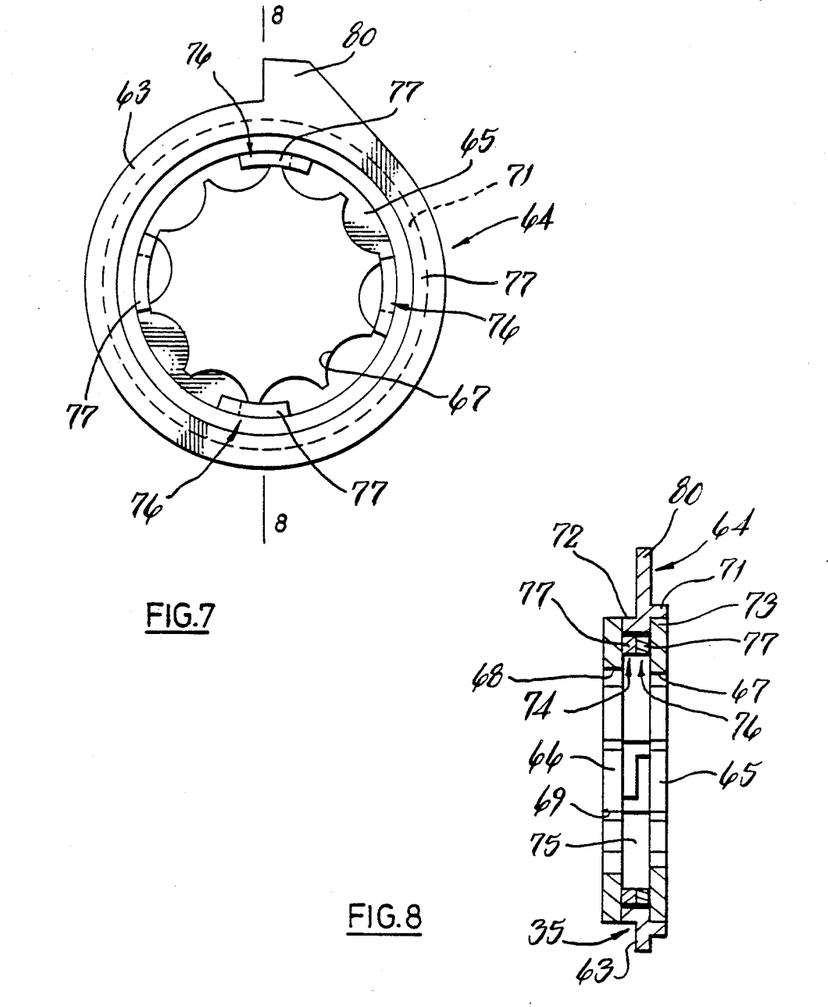
FIG. 7 is a side view of part of the rotary sealing means of the metering device.
FIG. 8 is a diametral section of the stay sealing means

A set of four equi-angularly speed, L-shaped locking tangs 74, 76 is provided on each sealing ring 65, 66, and the free ends 77 of each set extend circumferentially in one sense around one ring and in the opposite sense around the other ring so that adjacent free ends 77 engage behind one another when the rings are rotated relative to one another (FIG. 8). The central openings 67, 68 in the two rings 65, 66 are then angularly aligned to engage the flutes of the feed roll. Thus the two sealing rings 65, 66 are assembled together on the support ring 64 to form the complete rotary sealing means 35, and this is fitted over the fluted feed roll 29, and the circular wall 71 on the rear of the support ring 64 is engaged in the U-shaped slot 25 in the side wall 8 of the housing.

When the closure flap 36 is closed, (FIG. 5) the peripheral flange 63 of the support ring 64 overlaps the side wall portion 37 of the flap and a substantially semicircular notch 78 in the side wall portion 37 closely engages the periphery of the circular wall 71 at the rear of the support ring. Also, a pair of abutment lugs 79 are provided on the side wall portion 37, top and bottom, with their free ends spaced away from the side wall portion 37 so as to overlap the peripheral flange 63 of the support ring 64. Thus the two abutment lugs 79 on the closure flaps 36 and the abutment lug 62 controlled by the control lever 52, serve to retain the support ring 64 axially in place against the side wall 8 of the housing, the abutment lugs 79 engaging automatically when the closure flap 36 is closed, and the abutment lug 62 engaging automatically when the control lever 52 is operated to latch the door closed.

Once fitted in place, rotation of the support ring 64 is prevented by a radially projecting lug 80 at the periphery of the ring that cooperates with a stop 81 formed in the housing side wall 8 below the fastening flange 13.

Engagement of the cut-off member 31 in the slot 26 in the housing side wall 9, and its retention therein by the side wall portion 59 of the closure flap 36, is shown in FIG. 4 and 6. The cut-off member 31 is non-circular in cross-section and has an arcuate segment 82 that conforms to the outer radius of the feed roll 29 adjacent the rear walls 11, 39 of the housing and closure flap; a projecting segment 83 that extends beyond the radius of the feed roll 29 and has an abutment surface 84 at its tip for the cut-off flap 42; and a reduced segment 85 facing into the seed chamber 48 within the housing. Slot 26 in the side wall 9 is shaped to engage the reduced segment 85 and the adjacent flank 86 of the projecting segment 83 as far as the abutment surface 84. The side wall portion 38 of the closure member 36 is formed with a notch 87 that engages the abutment surface 84, the rear flank 88 of the projecting segment 83 and the arcuate segment 82. The cut-off member 31 can therefore assume only one angular orientation matching slot 26 and notch 87 when fitted into the housing.

A step 89 is formed in the side wall of the housing below the slot 26 (FIG. 6) and is used to support the cut-off member 31 when removed from the housing with the closure flap open. The step has a straight edge 90 that is inclined slightly downwards towards an upright straight edge 91 that leads to the slot 26. The flanks 86, 88 and abutment surface 84 of the projecting segment 82 on the cut-off member, are also straight so that the cut-off member can rest in a stable manner on the one flank 88 with the abutment surface 84 in the angle of the step between its edges 90 and 91 as shown in broken outline in FIG. 6. If the cut-off member is then moved forwards towards the slot 26, the corner of the projecting segment 82 between the abutment surface 84 and the flank 86 engages the upright edge 91. Continued forwards movement then causes the cut-off member to roll further forwards over the corner between the upright edge 91 of the step and the slot 26, the flank 86 then swinging into engagement with the lower edge of the slot 26. Thus, the step 89 and projecting segment 82 cooperate so that the cut-off member is automatically orientated in the correct angular position as it is inserted into the slot 26.

The closure flap 36, as shown in FIG. 4, is provided with an automatically engaging catch to hold it in the open position. This comprises a lug 92 that is provided on the flap 36 (made as a plastic moulded component) and is located alongside the pivot lugs 40 so as to cooperate with a projection 93 on the rear edge of the adjacent side wall 9. The lug 92 is resilient enough to ride over the projection 93 when the flap is raised to the open position shown in broken outline in FIG. 4, and thereafter retains the flap in the open position against its own weight.

A window 94 is provided in the rear wall 39 of the flap to allow observation of metered seed and fertilizer. The window is provided in an opening 95 in the rear wall 39 and is pivoted along the top edge of the opening at 96 so that it can be opened if necessary. The window is composed of transparent plastic material and is formed with an outwardly projecting tab 97 at its lower edge to engage the lower edge of the window, opening 96 and thereby serve as a stop closing the window and a handle when opening the window. An inwardly projecting resilient lug 98 is also formed at the lower edge of the window and serves to engage over the lower edge of the window opening to hold the window closed. A pair of resilient projections 99 on the side edges of the window cooperate with the side wall portions 37, 38 of the flap when the window is opened through more than 180 degrees and thereby serve to hold the window open.

Figure 2:
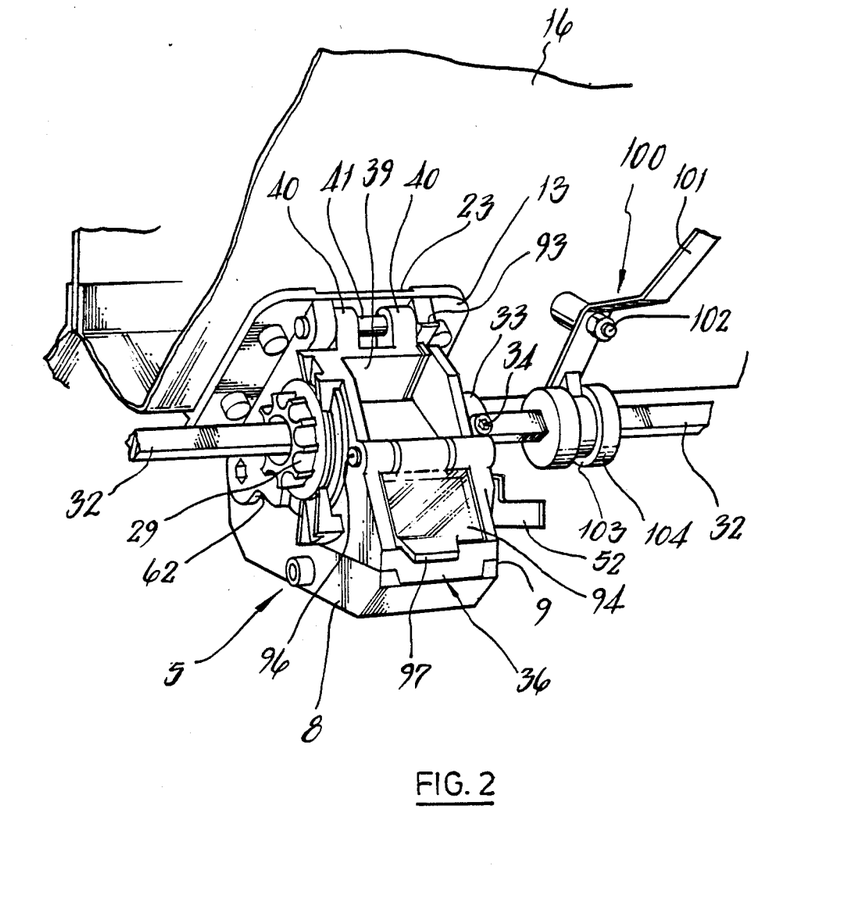
FIG. 2 is a perspective view of a metering device with the rear closure flap closed.
Figure 3:
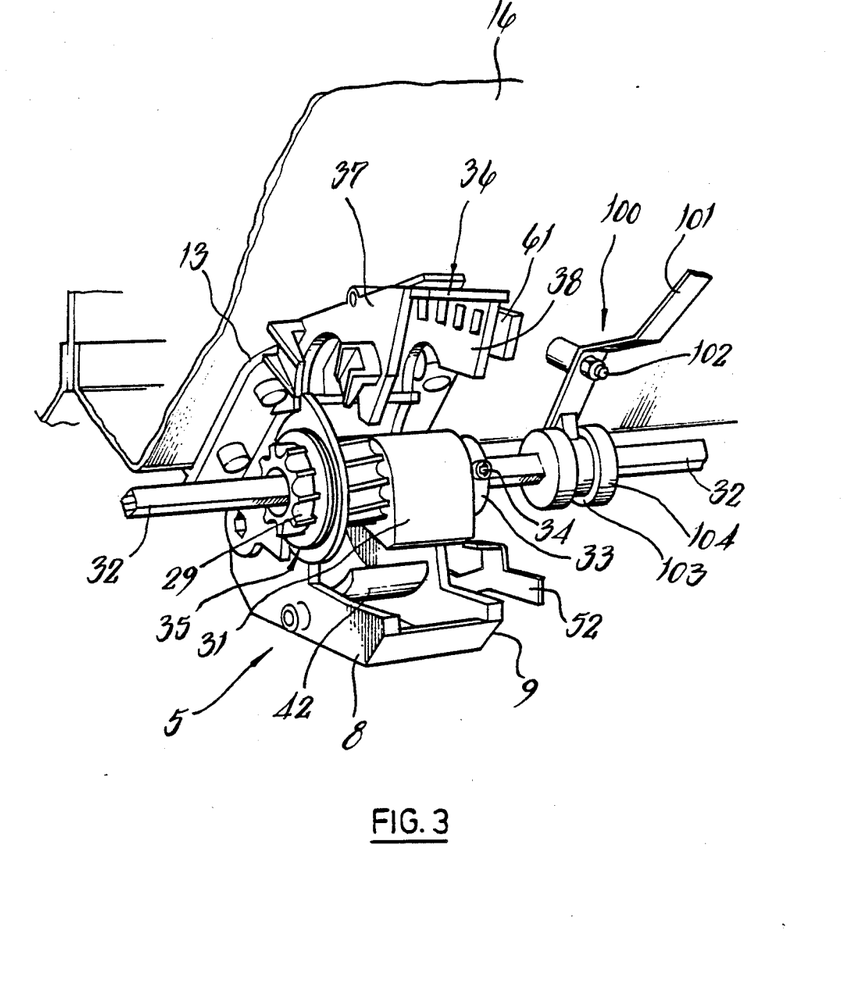
FIG. 3 is a perspective view like FIG. 2 with the rear closure flap open.

It will be appreciated from FIGS. 1 and 2 that a plurality of metering devices are driven by the one coaxial drive shaft 32 that passes through a rotary metering member 27 in each. The metering rate of these devices is adjusted simultaneously by moving the shaft 32 axially under the control of a lever adjust mechanism 100 that is mounted on the bottom wall 16 of the hopper. This mechanism comprises a lever 101 connected to pivot about a pivot pin 102 and engage a recess 103 in a cylindrical guide 104 on the shaft 32.

Removal of the rotary metering members 27 on the common shaft 32 can be achieved readily by opening all the closure flaps 36 and pulling the shaft 32 rearwards. The metering devices can then be cleaned or the rotary metering members 27 replaced, for example, by metering members having feed rolls with shallower flutes for smaller seeds. The metering members can then be readily re-inserted into the housings by locating the cut-off member 31 of each on the respective step 89, as described above, and pushing the shaft 32 forwards to roll the cut-off members 31 into the slots 26. The sealing support ring 64 is then located in the slot 25 of each unit, before the closure flap 36 of each housing is closed and latched closed by the control lever 52.

I claim:

1. A metering device comprising a housing having a pair of side walls each formed with an open slot, a feed roll and cut-off member mounted on a rotary drive shaft that extends through said slots transversely of said side walls with the feed roll located in one of said slots and the cut-off member located in the other of said slots so that said slots vertically supports said feed roll, cut-off member and drive shaft but allow removal of these members in a direction laterally of said drive shaft, rotary sealing means located in said one slot to seal between the side wall and the feed roll so as to allow rotation and axial movement of the feed roll relative to the slot, a cut-off flap adjustably mounted within the housing to co-operate with the feed roll and cut-off member so as to control metering, a closure member pivotally connected to the housing and having side wall portions that co-operate with the side walls of the housing to close said open slots and encircle the rotary sealing means and cut-off member to hold them radially captive, and a transparent window member pivotally connected to the closure member.

2. A metering comprising a housing having a pair of side walls each formed with an open slot, a feed roll and cut-off member mounted on a rotary drive shaft that extends through said slots transversely of said side walls with the feed roll located for axial movement in one of said slots and the cut-off member located for axial movement in the other of said slots, a rotary sealing means located in said one slot to seal around the slot between the side wall and the feed roll so as to allow rotation and axial movement of the feed roll relative to the side wall, and a cut-off flap connected with an external control lever and pivotally mounted within the housing to co-operate with the feed roll and cut-off member so as to control metering, said slots vertically supporting said feed roll, cut-off member and drive shaft but allowing removal of these members in a direction laterally of said drive shaft, and a closure member pivotally connected to the housing and having side wall potions that co-operate with the side walls of the housing to close said slots and encircle the rotary sealing means and cut-off member to hold them radially captive but allow said axial movement of both the feed roll and cut-off member in their respective slots, the control lever being selectively co-operable with stop means on the closure member to hold the control lever in any one of a plurality of angular positions relative to the housing to provide variable control of the metering and to hold the closure member in position closing the slots.

3. A metering device as claimed in claim 2 characterised in that the closure member incorporates a transparent window through which the metering of material can be observed, the window portion being pivotable relative to the remainder of the closure member to give access to the metering device without opening the slots.

4. A metering device as claimed in claim 2 characterised in that the control lever is also connected to abutment means that is engageable with the rotary sealing means to retain the latter in its respective slot.

5. A metering device as claimed in claim 4 characterised in that the abutment means connected to the control lever comprises a lug that overlaps a peripheral portion of the rotary sealing means to retain the latter against the outer face of said side wall when the control lever is in engagement with the stop means, disengagement of the control lever from the stop means and angular movement thereof to an open position causing said lug to free said peripheral portion of the rotary sealing means.

6. A metering device as claimed in claim 5 characterized in that said control lever and lug are connected to opposite ends of a pivot shaft that extends through the housing between the two side walls.

7. A metering device comprising a housing having a pair of side walls each formed with a slot, a rotary metering member that is rotatably mounted in said slots in the side walls of the housing with its axis of rotation extending transversely of said side walls and that is removable from the housing through said slots in a direction extending laterally of said axis of rotation, a closure member which is releasably connected to the housing so as to extend across and close the slots thereby to retain the rotary metering member therein, a cut-off flap pivotally mounted within the housing to co-operate with the rotary metering member, and a control lever mounted externally of the housing and is selectively co-operable with stop means on the closure member to hold the control lever in any one of a plurality of angular positions relative to the housing to provide variable control of the metering and to hold the closure member in position closing the slots and retaining the metering member therein.

8. A metering device as claimed in claim 7 characterised in that the rotary metering member comprises a feed roll mounted on an axial drive shaft alongside a non-rotary cut-off member having a non-circular cross-section so that a portion thereof projects radially and forms an abutment for the cut-off flap mounted within the housing.

9. A metering device as claimed in claim 8 characterised in that the cut-off member is orientated angularly in the housing by engagement in one of said slots in the respective adjacent side one wall of the housing, said slot having a shape matching that of part of the non-circular periphery of the cut-off member.

10. A metering device as claimed in claim 9 characterised in that the cut-off member is retained in said one shaped slot by a side wall portion of the closure member lying in the same plane as said side wall of the housing and having a shaped edge to match the adjacent periphery of the cut-off member, said slot and side one wall portion of the closure member together closely surrounding the whole periphery of the cut-off member.

11. A metering device as claimed in claim 7 characterised in that the rotary metering member comprises a feed roll that is an axial sliding fit in an opening in a rotary sealing means mounted in the other of said slots in the respective adjacent side wall of the housing to seal between the feed roll and the slot.

12. A metering device as claimed in claim 11 characterised in that said control lever is connected to abutment means that is engageable with the rotary sealing means to retain the latter in said other slot.

13. A metering device as claimed in claim 12 characterised in that the abutment means connected to the control lever comprises a lug that overlaps a peripheral portion of the rotary sealing means to retain the latter against the outer face of said side wall when the control lever is in engagement with the stop means, disengagement of the control lever from the stop means and angular movement thereof to an open position causing said lug to free said peripheral portion of the rotary sealing means.

14. A metering device as claimed in claim 13 characterised in that said control lever and lug are connected to opposite ends of a pivot shaft that extends through the housing between the two side walls.

15. A metering device as claimed in claim 11 characterised in that said rotary sealing means comprises a rotary seal assembly formed with the opening for the feed roll, and an outer annular support member within which the seal assembly is free to rotate.

16. A metering device as claimed in claim 15 characterised in that the outer annular support member is formed with an abutment that co-operates with an abutment on the housing to prevent relative rotation thereof.

17. A metering device as claimed in claim 11 characterised in that abutment means are provided on the enclosure member to retain the rotary sealing means in said other slot.

18. A metering device as claimed in claim 17 characterised in that said abutment means comprises a side wall portion of the closure member lying in the same plane as said other side wall of the housing so that said slot and side wall portion of the closure member together closely surround the whole periphery of the rotary sealing means.

19. A metering device as claimed in claim 18 characterised in that a peripheral portion of the rotary sealing means overlaps the outer surface of said side wall and side wall portion of the closure member, and is retained axially against said outer surface by overlapping abutment formations on said side wall portion.

20. A metering device as claimed in claim 19 in which said overlapping abutment formations comprises a pair of lugs spaced apart around the rotary sealing means.

21. A metering device comprising a housing having a pair of side walls each formed with an open slot, a feed roll and cut-off member mounted on a rotary drive shaft that extends through said slots transversely of said side walls with the feed roll located in one of said slots and the cut-off member located in the other of said slots so that said slots vertically support said feed roll, cut-off member and drive shaft but allow removal of these members in a direction laterally of said drive shaft, a rotary sealing means located in said one slot to seal between the side wall and the feed roll so as to allow rotation and axial movement of feed roll relative to said one slot, a cut-off flap adjustably mounted within the housing to co-operate with the feed roll and cut-off member so as to control metering, a closure member pivotally connected to the housing and having side wall portions that co-operate with the side walls of the housing to close said open slots and encircle the rotary sealing means and cut-off member to hold them radially captive, and a control lever pivotally mounted externally of the housing and connected with the cut-off flap, the control lever being engageable with stop means on the closure member to provide variable control of the metering and to hold the closure member in position closing both slots thus retaining the feed roll and cut-off member therein, the control lever also being connected to abutment means that is engageable with the rotary sealing means to retain the latter in its respective slot.

22. A metering device as claimed in claim 21 characterised in that the abutment means connected to the control lever comprises a lug that overlaps a peripheral portion of the rotary sealing means to retain the latter against the outer face of said side wall when the control lever is in engagement with the stop means, disengagement of the control lever from the stop means and angular movement thereof to an open position causing said lug to free said peripheral portion of the rotary sealing means.

23. A metering device as claimed in claim 22 characterised in that said control lever and lug are connected to opposite ends of a pivot shaft that extends through the housing between the two side walls.

* * * * *